Dec. 20, 1966  B. F. G. CHESNOT  3,293,506
ELECTROLYTIC CAPACITORS AND ELECTROLYTE THEREFOR
Filed Oct. 8, 1963
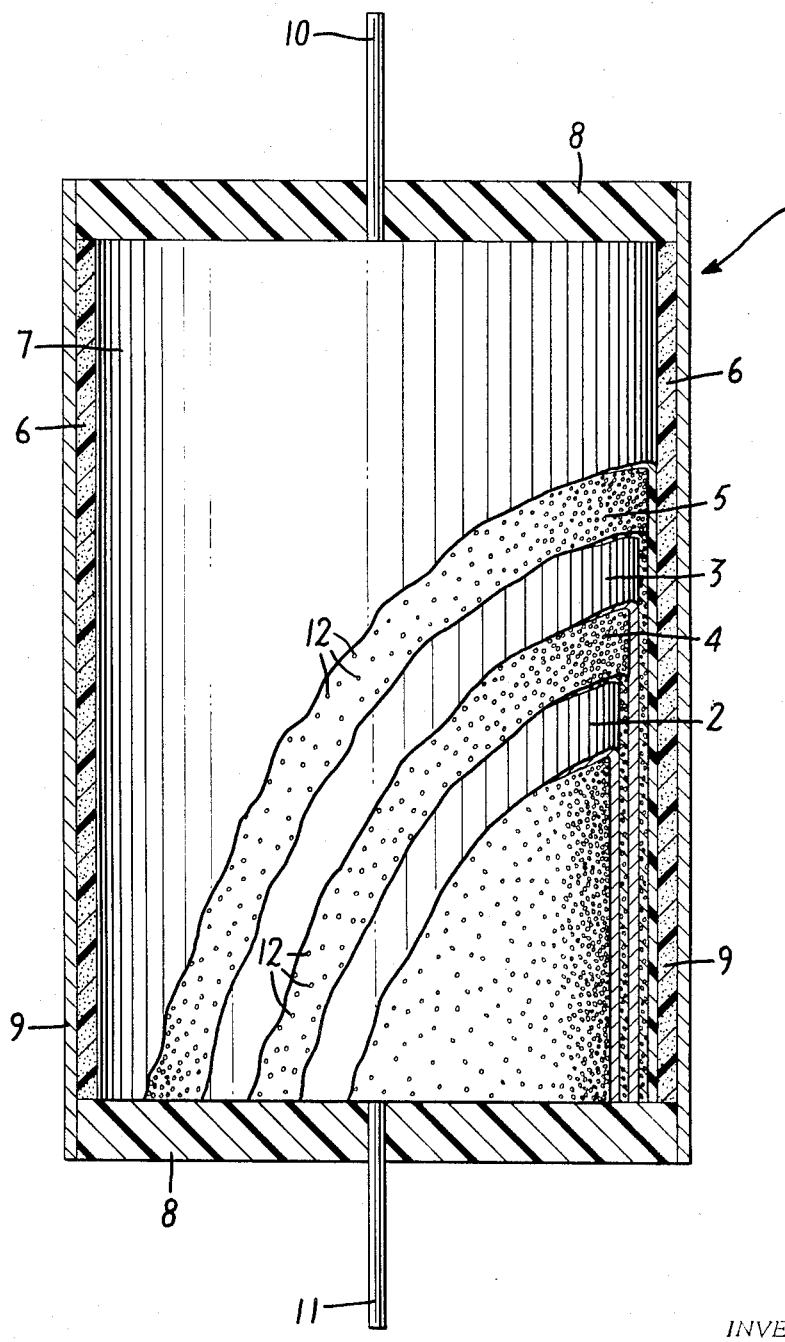
INVENTOR.
BERNARD F. G. CHESNOT
his ATTORNEYS 3,293,506
ELECTROLYTIC CAPACITORS AND
ELECTROLYTE THEREFOR
Bernard F. G. Chesnot, Paris, France, assignor to Marc
Wood International, Inc., New York, N.Y., a corporation of Delaware
Filed Oct. 8, 1963, Ser. No. 314,606
24 Claims. (Cl. 317—230)

The present invention relates to an electrolyte for an electrolytic capacitor and to an electrolytic capacitor containing the electrolyte.

The two main difficulties encountered in the course of life and shelf-life tests on electrolytic capacitors are maintaining the stability of the capacitance and the stability of the gaseous pressure in the can. In the case of an aluminum electrolytic capacitor, for example, it is known that the stability of the capacitance depends on preserving the dielectric aluminum oxide film on the anode in its initial integrity after forming, and preserving the initial surface condition of the cathode. The alumina film on the anode can be damaged in two ways by the components of the electrolyte, namely by attack by too strong a cation or anion and by hydration due to the small quantities of water always present.

Most of the manufacturers of aluminum capacitors have been employing electrolytes containing the ammonium or alkyl amine salts of boric acid dissolved in ethylene glycol, the pH of which varies from 5 to 7.5, depending on the specific case, in order to avoid attack of the dielectric alumina film on the anode by the anion or the cation. For several years, new efforts have been made to obtain better impedance characteristics at low temperatures by replacing these salts of boric acid with salts of stronger acids or with nitro-compounds, such as the alkyl amine salts of picric acid and salts of 3,5-dinitrobenzoic acid. However, the nitro-compounds do not constitute a good solution to the low temperature impedance problem, since they become hydrogenated during the operation of the capacitor, thereby producing strong and insoluble amine bases which locally modify the pH and cause a change in capacitance with corrosion of the capacitor. There have even been proposed the use of anions of much more complex formula, such as quinalizarin-2-sulfonic acid and anthraquinone-2,6-disulfonic acid, but they are costly and special solvents, such as diethyl-2-chloroethyl phosphate or diethyl-2-chlorophenyl phosphate, are required in order to cause them to operate as electrolytes.

With respect to the attack of the film of alumina by hydration, the addition of sodium silicate has been proposed. However, this compound does not dissolve in sufficient quantity in the above-mentioned ethylene glycol electrolytes customarily used with aluminum capacitors.

The stability of the gaseous pressure within the hermetic can of the capacitor depends on the production of hydrogen gas, which process and the effects thereof have been fully described in the preamble to U.S. Patent 3,052,829. The hydrogen gas is produced to a minor extent by the leakage current of the electrolytic cell formed by the capacitor, but it is produced to a greater extent by the discharge at the cathode of ammonium ions in accordance with the reaction: $2NH_4^+ + 2e \rightarrow 2NH_3 + H_2$. In order to absorb this hydrogen, fixing agents have been tried, such as azobenzene and the quinones, but these substances have the same drawback of being insoluble in the conventional glycol solvents as the sulfonic acids mentioned above, and it is therefore necessary to employ special solvents.

There has been discussed above the disadvantage of the nitro-compounds which are converted by hydrogenation into amine bases which in turn produce ammonium ions capable of discharging at the cathode. The U.S. patent referred to above offers an effective solution, the principle of which is to avoid the formation of hydrogen gas by using a cation which produces a primary radical capable of cleavage without producing hydrogen in accordance with the reaction:

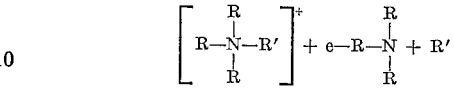

in which the radicals produced are relatively stable after cleavage. The substance used to produce these primary cations is cinnamyl triethylammonium borate. The cleavage produces triethylamine and a cinnamyl radical. This solution, however, has the drawback of using a large cation containing an aromatic ring which cannot give impedance values which are as low at low temperature as electrolytes which employ the ammonium or triethanolamine cations. On the other hand, the use of small cations, such as Ag+, is not possible due to their insolubility.

The drawing is a front elevation sectional view of an illustrative embodiment of a wound foil electrode dry electrolytic capacitor of the invention.

Accordingly, it is an object of the present invention to provide an aqueous electrolyte for an electrolytic capacitor which will impart thereto a stable capacitance and a stable gaseous pressure in the can. A further object of the present invention is to provide an aqueous electrolyte for an electrolytic capacitor which will also impart thereto low variation in power factor, low leakage current, no cathode corrosion, low building time of the anode foil and low impedance even at low operating temperatures of −20° C. and −40° C.

The aqueous electrolyte of the invention contains anions of at least one aliphatic dicarboxylic acid and cations of an alkanolamine dissolved in a water-alcohol co-solvent medium having a buffering agent therein. In the preferred electrolyte, ammonium cations are also present.

Water is present in the electrolyte in an amount from about 1.3 to about 4.3 moles, and preferably in an amount from about 3.0 to about 3.6 moles. The water serves as a co-solvent and ionization medium for the anions and cations of the electrolyte.

The electrolyte contains about 18 moles of an aliphatic monohydric or dihydric alcohol having from 1 to 6 carbon atoms which serves as a co-solvent medium for the anions and cations of the electrolyte. The alcohol and water components together form an anti-freeze solvent medium so that the electrolytic capacitor can operate at a temperature as low as −20° C., and preferably as low as −40° C., without crystallization of the components therein. Exemplary useful alcohols include methanol, ethanol, n-propanol, i-propanol, butanol, amyl alcohol, hexanol, ethylene glycol, propylene glycol, butylene glycol, diethylene glycol and triethylene glycol. The preferred alcohol is ethylene glycol.

Boric acid is used in the electrolyte in an amount from about 0.1 to about 0.7 mole, and preferably in an amount of about 0.4 mole. The boric acid furnishes secondary anions and acts as a buffering agent to maintain the initial pH of the electrolyte at from about 5 to about 6, and generally at about 5.5.

The alkanolamine component of the electrolyte is present therein in an amount from about 0.65 to about 1.35 moles, and preferably from about 0.75 to about 0.95 mole. The alkanolamine serves as a source of the cations of the electrolyte. Typical alkanolamines which can be utilized include triethanolamine, triisopropanolamine, diethanolamine, diisopropanolamine and N-methyldiethanolamine.

The aliphatic dicarboxylic acid is utilized into the electrolyte in a total amount from about 0.7 to about 1 mole, and preferably about 0.85 mole. The aliphatic dicarboxylic acid can be either a saturated or an unsaturated aliphatic dicarboxylic acid having from 4 to 10, preferably from 4 to 7, carbon atoms or mixtures thereof. The aliphatic dicarboxylic acid serves as a source of primary anions of the electrolyte. A saturated aliphatic dicarboxylic acid further serves to stabilize the capacitance of the electrolytic capacitor by protecting the dielectric oxide film on the anode with a hydrophobic coating and such acid thereby permits the use in the electrolyte of large amounts of water without causing damage to the dielectric oxide film on the anode by hydration thereof. An unsaturated aliphatic dicarboxylic acid further serves to stabilize the gaseous pressure in the can by absorbing the hydrogen gas liberated at the cathode, which absorption converts the unsaturated acid into a saturated acid having the above mentioned desirable properties or functions.

Typical useful saturated aliphatic dicarboxylic acids include unsubstituted, fluoro-substituted, hydroxy-substituted, alkyl-substituted, and amino-substituted acids, such as adipic, allomucic, aspartic, azelaic, ethyl malonic, fluoroadipic, fluoro-glutaric, fluoro-succinic, glutamic, glutaric, malic, methyl succinic, mucic, pimelic, saccharic, sebacic, succinic, talomucic, and tartaric acids. The preferred saturated aliphatic dicarboxylic acid is adipic acid, because it has maximum effectiveness in stabilizing the capacitance of the electrolytic capacitor. It is thought that the adipic acid is more efficient in protecting the dielectric oxide (alumina) film on the aluminum anode against hydration by the hydrophobic coating which it forms thereon due to the fact that the carboxyl groups of adipic acid are arranged at approximately the same distance apart as the aluminum atoms in the alumina film on the anode.

Representative useful unsaturated aliphatic dicarboxylic acids include those containing one or more ethylenic or acetylenic bonds such as citraconic, fumaric, glutaconic, glutinic, itaconic, maleic, mesaconic, muconic, $\alpha$-dihydro-muconic and $\beta$-dihydro-muconic acids. The preferred unsaturated aliphatic dicarboxylic acids are maleic and fumaric acids.

If desired, various compatible additives, such as phosphates, chromates, and molybdates, can be present in small amounts in the electrolyte.

Two embodiments of the electrolyte of the invention contain a blend of about 1.3 to 4.3, preferably about 3.0 to 3.6, moles of water; about 18 moles of an aliphatic alcohol; about 0.1 to 0.7, preferably about 0.4, mole of boric acid; about 0.65 to 1.35, preferably about 0.75 to 0.95, mole of an alkanolamine; and about 0.7 to 1, preferably about 0.85, mole of either a saturated or an unsaturated aliphatic dicarboxylic acid. A third embodiment of the electrolyte of the invention contains a blend of about 1.3 to 4.3, preferably about 3.0 to 3.6, moles of water; about 18 moles of an aliphatic alcohol; about 0.1 to 0.7 preferably about 0.4, mole of boric acid; about 0.65 to 1.35, preferably about 0.75 to 0.95, mole of an alkanolamine; and about 0.7 to 1, preferably about 0.85, mole total of mixed aliphatic dicarboxylic acids made up of about 0.6 to 0.8, preferably about 0.68, mole of a saturated aliphatic dicarboxylic acid plus about 0.05 to 0.25, preferably about 0.17, mole of an unsaturated aliphatic dicarboxylic acid.

The three embodiments of the invention described above constitute electrolytes which are suitable for use in electrolytic capacitors designed to operate under a temperature range of $-20°$ C. to $+85°$ C. They impart thereto stable capacitance, stable gaseous pressure in the can, low variation in power factor, low leakage current, no cathode corrosion, low building time of the anode foil and low impedance. However, such electrolytes are not suitable for use in electrolytic capacitors designed to operate under a wider temperature range of $-40°$ C. to $+100°$ C., because the impedance of the electrolytic capacitors is too high under the lower temperature operating conditions encountered thereby.

A fourth and preferred embodiment of the invention is an electrolyte containing a blend of about 1.3 to 4.3, preferably about 3.0 to 3.6, moles of water; about 18 moles of an aliphatic alcohol; about 0.1 to 0.7, preferably about 0.4, mole of boric acid; about 0.12 to 0.22, preferably about 0.17, moles of an alkanolamine; about 1 to 1.1 moles of ammonia; and about 0.7 to 1, preferably about 0.85, mole total of mixed aliphatic dicarboxylic acids made up of about 0.6 to 0.8, preferably about 0.68, mole of a saturated aliphatic dicarboxylic acid plus about 0.05 to 0.25, preferably about 0.17, mole of an unsaturated aliphatic dicarboxylic acid. Such electrolyte can be used in electrolytic capacitors designed to operate not only under a temperature range of $-20°$ C. to $+85°$ C. but also under a wider temperature range of $-40°$ C. to $+100°$ C., because the electrolyte imparts to the electrolytic capacitor not only a low impedance under the lower temperature operating conditions encountered thereby but also imparts thereto stable capacitance, stable gaseous pressure in the can, low variation in power factor, low leakage current, no cathode corrosion and low building time of the anode foil.

The electrolytes of the invention are prepared by blending or mixing together the components thereof. The first and second above embodiments of the invention can be prepared by blending together an aliphatic alcohol, either a saturated or an unsaturated aliphatic dicarboxylic acid, boric acid and an alkanolamine at a temperature from about 120° C. to about 122° C. On cooling to about 80° C., deionized water is blended therewith to form the completed electrolyte.

The third and fourth above embodiments of the invention can be prepared by blending or mixing together an aliphatic alcohol, a saturated aliphatic dicarboxylic acid, boric acid, and ammonia, if any, at a temperature from about 120° C. to about 122° C. This blend is cooled to form about 100° C. to about 105° C. to thereby form one part of the electrolyte. The second part of the electrolyte is prepared by blending or mixing together an aliphatic alcohol, an unsaturated aliphatic dicarboxylic acid, boric acid, and an alkanolamine at a temperature from bout 120° C. to about 122° C. On cooling this second blend to about 80° C. deionized water is blended therewith. The two parts of the electrolyte are then mixed or blended together to form the finished electrolyte.

The electrolytes are suitable for use in electrolytic capacitors 1 of conventional structure having an aluminum anode 2 of 99.99% purity and having an aluminum cathode 3 of 99.5 to 99.9% purity. The porous separator or spacer elements 4 and 5 between the anode and cathode can be cellulose paper, glass cloth, or other suitable conventional inert materials. The spacer elements 4 and 5 are impregnated with the electrolyte 12 at a temperature from 65° C. for small pieces to 95° C. for very large windings. Although the use of heretofore known nonaqueous electrolytes necessitates a carefully controlled drying treatment of the paper spacer elements prior to impregnation in order to remove the moisture usually present therein, such disadvantageous pre-drying treatment is eliminated by the use of the aqueous electrolytes of the invention. It is advisable to adjust the ratio of electrolyte by elimination of the excess in the windings after impregnation, either by centrifugation or under a vacuum. This drying may be effected at 50° C. for small pieces and at 70–75° C. for large windings and its purpose is the elimination of the excess electrolyte not taken up by capillarity. These temperatures of impregnation and drying are not absolute, but rather they depend on the capillarity of the spacer element, the shrinkage and the size of the windings.

The windings of the capacitor are firmly fixed in their housing by tar or some wax 6 and may be suitably protected by a plastic sheet 7 of the polyolefin type or a cellulose polyolefin sheet combination. The windings are hermetically sealed 8 within the can 9 of the capacitor with the terminals 10 and 11 extending from one or more ends thereof.

The electrolytes and electrolytic capacitors of the invention are further illustrated by the following representative examples thereof.

*Examples 1–7*

The following seven electrolytes in Table I were prepared and incorporated into aluminum electrolytic capacitors in accordance with the procedures set forth above.

TABLE I

| Formulation No. | 1 | 2 | 3 | 4 | 5 | 6 | 7 |
|---|---|---|---|---|---|---|---|
| Components, Amounts (in moles): | | | | | | | |
| Water | 3.3 | 3.3 | 3.3 | 3.2 | 3.2 | 3.2 | 3.2 |
| Ethylene glycol | 18 | 18 | 18 | 18 | 18 | 18 | 18 |
| Triethanolamine (TEA) | 0.85 | 0.85 | 0.85 | 0.17 | 0.85 | 0.17 | 0.17 |
| Ammonia (Am) | | | | | | 1.1 | 1.1 |
| Boric Acid | 0.4 | 0.4 | 0.4 | 0.4 | 0.4 | 0.4 | 0.4 |
| Adipic Acid | 0.85 | | | 0.68 | 0.68 | 0.68 | 0.68 |
| Fumaric Acid | | 0.85 | | 0.17 | | 0.17 | |
| Maleic Acid | | | 0.85 | | 0.17 | | 0.17 |

Life tests of 250 hours at 105° C. under 75 volts D.C. working voltage were run on these seven 50 microfarad/75 volt D.C. electrolytic capacitors. The variation in capacitance, variation in power factor, leakage current, cathode corrosion, building time of the anode foil, and impedance ratio of the capacitors were measured. The capacitors were made with a 99.99% aluminum anode formed to 115 volts D.C. The results of the tests set forth in Table II below are the mean of six capacitors in each formulations or are extreme values obtained on six capacitors.

fourth or preferred embodiment of the invention, on the other hand, have satisfactory impedance ratios $$Z-40° C./Z+20° C.$$

Hence they are suitable for use not only in electrolytic capacitors designed to operate over a temperature range of −20° C. to +85° C., but also over a wider and lower temperature range of −40° C. to +100° C. The data, therefore, reveal that the electrolytes and the electrolytic capacitors of the invention containing the same of the invention have an unusual combination of properties not heretofore obtainable with the presently existing electrolytes.

Results comparable to those set forth above in Table II are obtained when aliphatic alcohols, alkanolamines, saturated and/or unsaturated aliphatic dicarboxylic acids other than those set forth in Table I, i.e., those set forth hereinbefore, are utilized in preparing the electrolytes.

Although the electrolytes disclosed hereinbefore and claimed hereinafter are described and defined for ease of presentation and understanding as blends of a number of components, it will be readily understood by those skilled in the art that the anion-furnishing aliphatic dicarboxylic acids and boric acid, which are in appreciable molar excess, react in the solvent medium with the cation-furnishing basic alkanolamine and ammonia, when present, to form in situ the alkanolammonium and ammonium salts of these acids and leave an excess of unsalified acids. Accordingly, the electrolyte blends can be prepared and used by the direct incorporation therein of these salts and excess of acids.

It will be appreciated that various modifications and changes may be made in the electrolytes and electrolytic capacitors of the invention in addition to those variations set forth herein without departing from the spirit of the invention. Accordingly, the invention is to be limited only within the scope of the appended claims.

TABLE II

| No. | Formulation anion +(cation) | Variation of capacitance (percent) | Variation of Power Factor, Tg d (percent) | Leakage current (microamps.) at 105° C. after 250 hrs. | Cathode Corrosion | Bldg. time (sec.) at 109 volts of anode after 250 hrs. life test | Impedance ratio Z−40° C./Z+20° C. at 400 c.p.s. before life test | Impedance ratio Z−20° C./Z+20° C. at 1,000 c.p.s. before life test |
|---|---|---|---|---|---|---|---|---|
| | Acceptable Limits | Less than 10 | Less than 100 | Less than 3.75 | None | Less than 50 | Less than 5 | Less than 5 |
| 1 | Adipic+(TEA) | −1 to −2 | −10 to +80 | 1.2 to 2.0 | None | 42 | *17 | 4.6 |
| 2 | Fumaric+(TEA) | +1.5 to +6 | +10 to +70 | 2.0 to 2.8 | do | 48 | *12 | 3.7 |
| 3 | Maleic+(TEA) | +2.0 to +7 | +30 to +90 | 2.5 to 3.5 | do | 45 | *8.5 | 2.7 |
| 4 | Adipic+fumaric +(TEA) | 0 to +2 | −10 to +30 | 1.2 to 2.0 | do | 30 | *20 | 4.7 |
| 5 | Adipic+maleic +(TEA) | +2 to +3 | +10 to +50 | 1.0 to 3.0 | do | 36 | *13 | 4.3 |
| 6 | Adipic+fumaric +(Am+TEA) | +3 to +9 | +20 to +90 | 2.2 to 3.5 | do | 40 | 3.7 | 1.55 |
| 7 | Adipic+maleic +(Am+TEA) | +3 to +9 | +10 to +60 | 2.5 to 3.5 | do | 42 | 3.4 | 1.45 |

The data in Tables I and II above establish that the seven exemplary electrolyte formulations of the invention set forth therein were remarkably satisfactory in regard to stability of capacitance, stability of power factor, leakage current, cathode corrosion, building time of the anode foil, and impedance ratio $Z-20° C./Z+20° C.$ Therefore, all seven of the formulations which are representative of the four embodiments of the invention are satisfactory for use in electrolytes designed to operate over a temperature range of −20° C. to +85° C. It will be noted, however, that the starred (*) impedance ratio $$Z-40° C./Z+20° C.$$

values of formulations Nos. 1, 2, 3, 4 and 5 all exceed the permissible impedance ratio values. Accordingly, these five examples which are representative of the first three embodiments of the invention are not satisfactory for use in electrolytic capacitors designed to operate at a wider and lower temperature range of −40° C. to +100° C. Formulations Nos. 6 and 7, representing the

What is claimed is:

1. An electrolyte for an electrolytic capacitor consisting essentially of a blend of from about 1.3 to about 4.3 moles of water, about 18 moles of an alcohol selected from the group consisting of aliphatic monohydric and dihydric alcohols having from 1 to 6 carbon atoms, from about 0.65 to about 1.35 moles of an alkanolamine, from about 0.1 to about 0.7 mole of boric acid, and a total of from about 0.7 to about 1 mole of at least one aliphatic dicarboxylic acid selected from the group consisting of saturated and unsaturated aliphatic dicarboxylic acids having from 4 to 10 carbon atoms.

2. An electrolyte for an electrolytic capacitor consisting essentially of a blend of from about 1.3 to about 4.3 moles of water, about 18 moles of an alcohol selected from the group consisting of aliphatic monohydric and dihydric alcohols having from 1 to 6 carbon atoms, from about 0.65 to about 1.35 moles of an alkanolamine, from about 0.1 to about 0.7 mole of boric acid, and from about 0.7 to about 1 mole of a saturated aliphatic dicarboxylic acid having from 4 to 7 carbon atoms.

3. An electrolyte for an electrolytic capacitor consisting essentially of a blend of from about 3.0 to about 3.6 moles of water, about 18 moles of ethylene glycol, from about 0.75 to about 0.95 mole of triethanolamine, about 0.4 mole of boric acid, and about 0.85 mole of adipic acid.

4. An electrolyte for an electrolytic capacitor consisting essentially of a blend of from about 1.3 to about 4.3 moles of water, about 18 moles of an alcohol selected from the group consisting of aliphatic monohydric and dihydric alcohols having from 1 to 6 carbon atoms, from about 0.65 to about 1.35 moles of an alkanolamine, from about 0.1 to about 0.7 mole of boric acid, and from about 0.7 to about 1 mole of an unsaturated aliphatic dicarboxylic acid having from 4 to 7 carbon atoms.

5. An electrolyte for an electrolytic capacitor consisting essentially of a blend of from about 3.0 to about 3.6 moles of water, about 18 moles of ethylene glycol, from about 0.75 to about 0.95 mole of triethanolamine, about 0.4 mole of boric acid, and about 0.85 mole of fumaric acid.

6. An electrolyte for an electrolytic capacitor consisting essentially of a blend of from about 3.0 to about 3.6 moles of water, about 18 moles of ethylene glycol, from about 0.75 to about 0.95 mole of triethanolamine, about 0.4 mole of boric acid, and about 0.85 mole of maleic acid.

7. An electrolyte for an electrolytic capacitor consisting essentially of a blend of from about 1.3 to about 4.3 moles of water, about 18 moles of an alcohol selected from the group consisting of aliphatic monohydric and dihydric alcohols having from 1 to 6 carbon atoms, from about 0.65 to about 1.35 moles of an alkanolamine, from about 0.1 to about 0.7 mole of boric acid, and from about 0.7 to about 1 mole total of a mixture of from about 0.6 to about 0.8 mole of a saturated aliphatic dicarboxylic acid having from 4 to 7 carbon atoms plus from about 0.05 to about 0.25 mole of an unsaturated aliphatic dicarboxylic acid having from 4 to 7 carbon atoms.

8. An electrolyte for an electrolytic capacitor consisting essentially of a blend of from about 3.0 to about 3.6 moles of water, about 18 moles of ethylene glycol, from about 0.75 to about 0.95 mole of triethanolamine, about 0.4 mole of boric acid, and about 0.85 mole total of a mixture of about 0.68 mole of adipic acid plus about 0.17 mole of fumaric acid.

9. An electrolyte for an electrolytic capacitor consisting essentially of a blend of from about 3.0 to about 3.6 moles of water, about 18 moles of ethylene glycol, from about 0.75 to about 0.95 mole of triethanolamine, about 0.4 mole of boric acid, and about 0.85 mole total of a mixture of about 0.68 mole of adipic acid plus about 0.17 mole of maleic acid.

10. An electrolyte for an electrolytic capacitor consisting essentially of a blend of from about 1.3 to about 4.3 moles of water, about 18 moles of an alcohol selected from the group consisting of aliphatic monohydric and dihydric alcohols having from 1 to 6 carbon atoms, from about 0.12 to about 0.22 mole of an alkanolamine, from about 1 to about 1.1 moles of ammonia, from about 0.1 to about 0.7 mole of boric acid, and from about 0.7 to about 1 mole total of a mixture of from about 0.6 to about 0.8 mole of a saturated aliphatic dicarboxylic acid having from 4 to 10 carbon atoms plus from about 0.05 to about 0.25 mole of an unsaturated aliphatic dicarboxylic acid having from 4 to 10 carbon atoms.

11. An electrolyte for an electrolytic capacitor consisting essentially of a blend of from about 3.0 to about 3.6 moles of water, about 18 moles of ethylene glycol, about 0.17 mole of triethanolamine, from about 1 to about 1.1 moles of ammonia, about 0.4 mole of boric acid, and about 0.85 mole total of a mixture of about 0.68 mole of adipic acid plus about 0.17 mole of fumaric acid.

12. An electrolyte for an electrolytic capacitor consisting essentially of a blend of from about 3.0 to about 3.6 moles of water, about 18 moles of ethylene glycol, about 0.17 mole of triethanolamine, from about 1 to about 1.1 moles of ammonia, about 0.4 mole of boric acid, and about 0.85 mole total of a mixture of about 0.68 mole of adipic acid plus about 0.17 mole of maleic acid.

13. An electrolytic capacitor comprising an anode, a cathode and an inert spacer element therebetween impregnated with the electrolyte defined by claim 1.

14. An electrolytic capacitor comprising an anode, a cathode and an inert spacer element therebetween impregnated with the electrolyte defined by claim 2.

15. An electrolytic capacitor comprising an anode, a cathode and an inert spacer element therebetween impregnated with the electrolyte defined by claim 3.

16. An electrolytic capacitor comprising an anode, a cathode and an inert spacer element therebetween impregnated with the electrolyte defined by claim 4.

17. An electrolytic capacitor comprising an anode, a cathode and an inert spacer element therebetween impregnated with the electrolyte defined by claim 5.

18. An electrolytic capacitor comprising an anode, a cathode and an inert spacer element therebetween impregnated with the electrolyte defined by claim 6.

19. An electrolytic capacitor comprising an anode, a cathode and an inert spacer element therebetween impregnated with the electrolyte defined by claim 7.

20. An electrolytic capacitor comprising an anode, a cathode and an inert spacer element therebetween impregnated with the electrolyte defined by claim 8.

21. An electrolytic capacitor comprising an anode, a cathode and an inert spacer element therebetween impregnated with the electrolyte defined by claim 9.

22. An electrolytic capacitor comprising an anode, a cathode and an inert spacer element therebetween impregnated with the electrolyte defined by claim 10.

23. An electrolytic capacitor comprising an anode, a cathode and an inert spacer element therebetween impregnated with the electrolyte defined by claim 11.

24. An electrolytic capacitor comprising an anode, a cathode and an inert spacer element therebetween impregnated with the electrolyte defined by claim 12.

References Cited by the Examiner

UNITED STATES PATENTS

| | | | |
|---|---|---|---|
| 2,084,046 | 6/1937 | Owen | 317—230 |
| 2,932,153 | 4/1960 | Bernard et al. | 317—230 |
| 2,965,816 | 12/1960 | Ross | 317—230 |
| 3,138,746 | 6/1964 | Burger et al. | 317—230 |

JOHN W. HUCKERT, *Primary Examiner.*

J. D. KALLAM, *Assistant Examiner.*